No. 820,923. PATENTED MAY 15, 1906.
T. GARE.
WOODEN SPOKE WHEEL.
APPLICATION FILED JULY 17, 1905.

Witnesses:
Alfred Bosshardt.
Stanley R Bramall

Inventor.
Thomas Gare.
Per J. Bosshardt.
Attorney.

UNITED STATES PATENT OFFICE.

THOMAS GARE, OF NEW BRIGHTON, ENGLAND.

WOODEN-SPOKE WHEEL.

No. 820,923.                Specification of Letters Patent.           Patented May 15, 1906.

Original application filed January 15, 1904, Serial No. 189,173. Divided and this application filed July 17, 1905. Serial No. 270,073.

*To all whom it may concern:*

Be it known that I, THOMAS GARE, a subject of the King of Great Britain, residing at New Brighton, in the county of Chester, Kingdom of Great Britain, have invented new and useful Improvements in Wooden-Spoke Wheels, of which the following is a specification.

My invention relates to improvements in wooden-spoke wheels, and has for its object to so arrange the spokes that such wheels are rendered more durable and resilient than hitherto has been the case. I attain these objects by the means illustrated in the accompanying drawings, in which—

Figure 1:
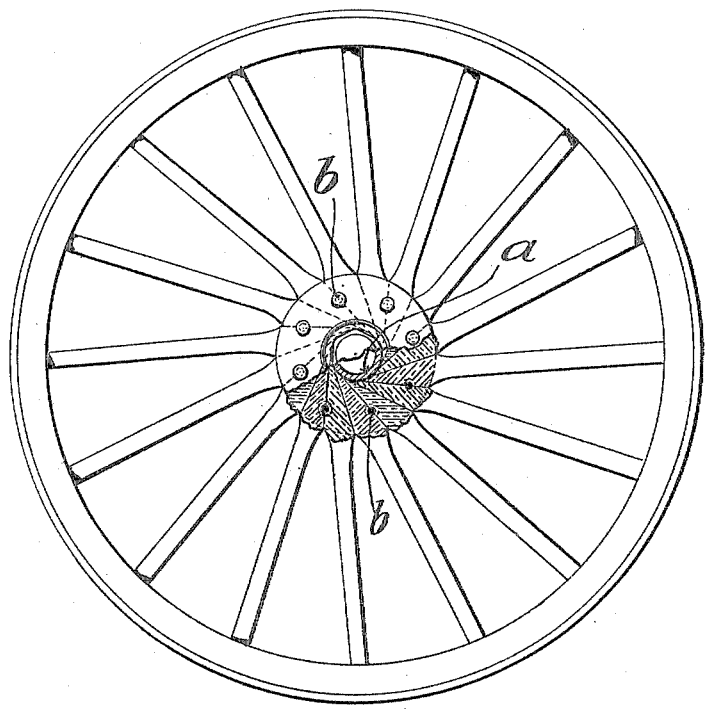
Figure 2:
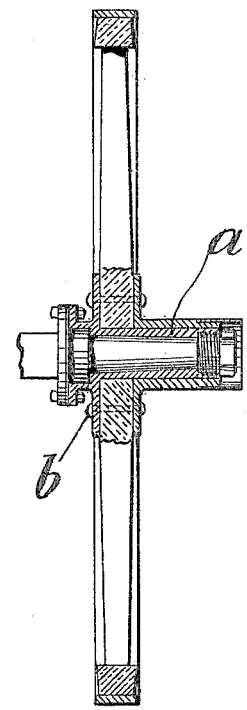

Figure 1 is a side view, partly in section; and Fig. 2, a cross-section of a wooden-spoke wheel constructed in accordance with my invention.

Similar letters refer to similar parts throughout both views.

In carrying out my invention and referring to the figures generally I arrange the spokes with their axis tangent to the bore, boss, or hub $a$ of the wheel, whereby the pressure exerted upon the outer ends of the spokes will be transmitted obliquely to the side of instead of radially against the end of the grain of the spokes, which makes the wheel resilient and more durable than hitherto has been the case, as the spokes are less liable to split or wear. The inner ends of these tangent spokes are wedge-fashioned and bear tangent to the bore, boss, or hub $a$ of the wheel against each other. The said inner spoke ends are secured to flanges on the wheel boss or hub by rivets $b$ or bolts passing through or between the same and the said flanges.

What I claim as my invention, and desire to secure by Letters Patent, is—

1. In a wooden vehicle-wheel, spokes having wedge-shaped inner ends and sides both of which are tangent to the bore of the wheel, substantially as and for the purpose set forth.

2. In a wooden vehicle-wheel spokes having wedge-shaped inner ends and sides both of which are tangent to the bore of the wheel, a hub-flange on each side and rivets through the latter and the said ends, all substantially as and for the purpose set forth.

In testimony whereof I have signed my name to this specification in the presence of two subscribing witnesses.

THOMAS GARE.

Witnesses:
    ALFRED BOSSHARDT,
    STANLEY E. BRAMALL.